United States Patent
Moriarty et al.

(10) Patent No.: US 11,965,098 B2
(45) Date of Patent: Apr. 23, 2024

(54) PRESSING MOLD FRIENDLY BINDER FOR LIGNOCELLULOSIC COMPOSITES

(71) Applicant: Huntsman International LLC, The Woodlands, TX (US)

(72) Inventors: Christopher John Moriarty, The Woodlands, TX (US); Daniel Paul Heberer, The Woodlands, TX (US); Paul William Mackey, The Woodlands, TX (US)

(73) Assignee: HUNTSMAN INTERNATIONAL LLC

( * ) Notice: Subject to any disclaimer, the term of this patent is extended or adjusted under 35 U.S.C. 154(b) by 463 days.

(21) Appl. No.: 16/649,791

(22) PCT Filed: Sep. 11, 2018

(86) PCT No.: PCT/US2018/050418
§ 371 (c)(1),
(2) Date: Mar. 23, 2020

(87) PCT Pub. No.: WO2019/067201
PCT Pub. Date: Apr. 4, 2019

(65) Prior Publication Data
US 2020/0277499 A1    Sep. 3, 2020

Related U.S. Application Data

(60) Provisional application No. 62/565,692, filed on Sep. 29, 2017.

(51) Int. Cl.
*C08L 97/02* (2006.01)
*C08L 75/04* (2006.01)
*C09J 175/04* (2006.01)
*C08K 5/42* (2006.01)

(52) U.S. Cl.
CPC .............. *C08L 97/02* (2013.01); *C08L 75/04* (2013.01); *C09J 175/04* (2013.01); *C08K 5/42* (2013.01)

(58) Field of Classification Search
CPC ......... C08L 97/02; C08L 75/04; C09J 175/04; C08K 5/42
See application file for complete search history.

(56) References Cited

U.S. PATENT DOCUMENTS

| | | | |
|---|---|---|---|
| 4,376,088 A * | 3/1983 | Prather | C08K 3/30 264/300 |
| 4,478,738 A * | 10/1984 | Scholl | C08G 18/72 106/164.3 |
| 4,490,518 A * | 12/1984 | Fuzesi | C08G 18/70 524/13 |
| 4,528,117 A | 7/1985 | Scholl et al. | |
| 4,528,153 A | 7/1985 | Scholl et al. | |
| 4,898,776 A | 2/1990 | Israel et al. | |
| 5,587,414 A | 12/1996 | Leenslag et al. | |
| 6,288,200 B1 | 9/2001 | Jung et al. | |
| 6,288,255 B1 | 9/2001 | Skinner | |
| 6,750,310 B1 | 6/2004 | Skinner | |
| 6,762,314 B2 | 7/2004 | Partridge et al. | |
| 6,908,875 B2 | 6/2005 | Skinner et al. | |
| 2013/0019778 A1 | 1/2013 | Moriarty et al. | |

FOREIGN PATENT DOCUMENTS

| | | |
|---|---|---|
| RU | 2605583 C2 | 12/2016 |
| WO | 2016156226 A1 | 10/2016 |

OTHER PUBLICATIONS

International Search Report and Written Opinion received in corresponding PCT Application No. PCT/US2018/050418, search completed Oct. 29, 2018 and dated Dec. 11, 2018.
Translation of OA issued Dec. 9, 2022 for Corresponding Application No. 2020108399.

* cited by examiner

*Primary Examiner* — Cephia D Toomer
(74) *Attorney, Agent, or Firm* — Huntsman International; Lewis Craft

(57) ABSTRACT

A lignocellulosic mixture comprising: (a) a binder composition comprising: (i) an isocyanate compound; (ii) a sulfonic acid compound; and optionally, (iii) a catalyst compound, (iv) an acidifying compound different from Component (ii), and (v) other additive compounds; and (b) one or more lignocellulosic particles wherein at least a portion of the lignocellulosic particles is partially coated with the binder composition wherein the ADHESIVE MEMORY LOSS of the binder composition is less than or equal to 50 and the METAL LOSS on a surface of a metallic article that comes into contact with the binder composition is greater than or equal to −0.00009.

9 Claims, No Drawings

PRESSING MOLD FRIENDLY BINDER FOR LIGNOCELLULOSIC COMPOSITES

CROSS-REFERENCE TO RELATED APPLICATIONS

This application is the National Phase of International Application PCT/US2018/050418 filed Sep. 11, 2018 which designated the U.S. and which claims priority to U.S. Provisional App. Ser. No. 62/565,692 filed Sep. 29, 2017. The noted applications are incorporated herein by reference.

BACKGROUND

Field

The present disclosure relates generally to binder compositions used to bind lignocellulosic materials to form a lignocellulosic composite article.

Background

Polyphenylene polymethylene polyisocyanate ("pMDI") has been extensively used as a binder in the commercial production of cellulosic based wood composites such as lignocellulosic composite panels. One of the advantages of using pMDI in the production of such composites is that the binder imparts various physical and mechanical properties to the product in addition to enhancing the processability (e.g., production times) of such composites. For example, improved processability includes process efficiencies such as shorter pressing cycle times which results in increased production of the end product.

In some embodiments, lignocellulosic composite panels are manufactured by introducing a binder, such as pMDI, into a rotary blender that contains lignocellulosic particles. After the binder and the particles have been mixed, the mixture can be introduced into a mold or a press where it is subjected to heat and pressure (e.g., pressing process) thereby forming the composite panel. One drawback with the pressing process, however, is that long pressing times are typically required to cure the binder. While the composite panel manufacturer can increase the cure rate of the binder by using urethane catalysts known in the art, one drawback with the use of such catalysts is that additional binder must be used to compensate for the binder that is inactivated, which is due to pre-cure of the binder, prior to subjecting the mixture of binder and particles to a pressing process. In these instances, the manufacturer typically suffers additional costs associated with using more binder than what was anticipated.

Pre-cure of the binder is also a concern in cases where a mixture of lignocellulosic particles and binder are not subjected to a pressing process in a timely manner. In order to address the pre-cure issue, formulators have often relied on various strong inorganic acids (e.g., hydrochloric acid) to block the pMDI's isocyanate functional groups. These acids would de-couple from the isocyanate groups at elevated temperatures thereby allowing the composite to cure in a more controlled manner. Unfortunately, use of such acids may result in the corrosion of the processing equipment (e.g., steel molds) as the free acids are released during various stages of the process such as during hot pressing. Accordingly, the life span of an operator's processing equipment is limited by the use of acids to slow pre-cure of the binder composition.

DETAILED DESCRIPTION

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

Unless otherwise stated herein, reference to any compounds shall also include any isomers (e.g., stereoisomers) of such compounds.

Binder Composition and Blended Materials

The binder composition disclosed herein not only addresses the pre-cure issue mentioned above but it also minimizes or eliminates the potential of processing equipment corrosion.

The binder composition comprises: (i) an isocyanate compound, (ii) a sulfonic acid compound, and, optionally, (iii) a catalyst compound, (iv) an acidifying compound different from Component (ii), and (v) other additive compounds. In certain embodiments, the binder composition disclosed herein has an ADHESIVE MEMORY LOSS (defined in the Examples) of less than or equal to 50 (e.g., 40 to 0, 30 to 5, 20 to 10). In yet other embodiments, the METAL LOSS (defined in the Examples) of a metal substrate (e.g., metallic press) surface that comes into contact with the binder composition is greater than or equal to −0.00009 (e.g., −0.00005 to 1, −0.00002 to 0, −0.00001 to 0.000001, −0.000009 to −0.000005, or −0.000002 to 0).

In certain embodiments, the present disclosure is directed to a blended lignocellulosic mixture comprising: (a) the binder composition described above and (b) one or more lignocellulosic particles as well as the lignocellulosic composite article that results therefrom.

Component (i): Isocyanate Compound

The binder composition disclosed herein comprises one or more isocyanate compounds and various isocyanate compounds may be used as Component (i). For example, in certain embodiments, an isocyanate compound such as methylene diphenyl diisocyanate ("MDI") can be used as Component (i). Suitable examples of MDI include those available under the RUBINATE series of MDI products (available from Huntsman International LLC). It is well known in the art that many isocyanates of such MDI series can comprise polymeric MDI. Polymeric MDI is a liquid mixture of several diphenylmethane diisocyanate isomers and higher functionality polymethylene polyphenyl isocyanates of functionality greater than 2. These isocyanate mixtures usually contain about half, by weight, of the higher functionality species. The remaining diisocyanate species present in polymeric MDI are typically dominated by the 4,4'-MDI isomer, with lesser amounts of the 2,4' isomer and traces of the 2,2' isomer. Polymeric MDI is the phosgenation product of a complex mixture of aniline-formaldehyde condensates. It typically contains between 30 and 34% by weight of isocyanate (—NCO) groups and has a number averaged isocyanate group functionality of from 2.6 to 3.0.

In addition to the aforementioned isocyanate compounds, other suitable isocyanate compounds that can be used in the present disclosure include, without limitation, one or more members comprising aliphatic, aryl-aliphatic, araliphatic, aromatic, and heterocyclic polyisocyanates having number averaged isocyanate (—NCO) group functionalities of 2 or greater and organically bound isocyanate group concentrations of from about 1% by weight to about 60% by weight. The polyisocyanate compounds that may be used include prepolymers, pseudoprepolymers, and other modified variants of monomeric polyisocyanates known in the art that contain free reactive organic isocyanate groups. In certain embodiments, the isocyanate compound is liquid at 25° C.; has a viscosity at 25° C. of less than 10,000 cps, such as 5000 cps; and has a concentration of free organically bound isocyanate groups ranging from 10% to 33.6% by weight. In certain embodiments, an MDI series of isocyanates that is essentially free of prepolymers can be used as Component (i). In these embodiments, the isocyanates comprise less than 1% by weight (e.g., less than 0.1% by weight or, alternatively, 0% by weight) of prepolymerized species. Members of this MDI series comprise can have a concentration of free organically bound isocyanate groups ranging from 31% to 32% by weight, a number averaged isocyanate (NCO) group functionality ranging from 2.6 to 2.9, and a viscosity at 25° C. of less than 1000 cps.

Component (i) can comprise greater than or equal to 90 weight % (e.g, greater than or equal to 94%, 95%, 96%, 97%, 98%, or 99%) by weight of the binder composition based on the total weight of the composition. In these embodiments, all other components of the binder composition combined (e.g., Components (ii), (iii), (iv), and (v)) would, therefore, comprise the remainder of the composition.

Component (ii): Sulfonic Acid Compound

The binder composition disclosed herein comprises a sulfonic acid compound. Unlike other inorganic acid compounds that have been traditionally used in lignocellulosic binder compositions, the sulfonic acid compounds used herein as Component (ii) exhibit the same isocyanate functional group blocking properties as strong inorganic acids (e.g., hydrochloric acid or nitric acid) typically used in a binder composition. Not wishing to be bound by any particular theory, it is believed that the sulfonic acid compound, like hydrochloric acid, will interact (e.g., react) with the isocyanate functional group of Component (i) thereby blocking the functional group. The blocking of the isocyanate functional group prevents pre-cure of the binder composition because the isocyanate functional groups are not available to react with water in the atmosphere and/or on the surface of the lignocellulosic particles. Reactivity of the isocyanate functional group can then be restored when the sulfonic acid compound de-couples from the isocyanate functional group at the elevated temperatures typically found in the hot pressing process (e.g., 125° C. to 250° C., 150° C. to 210° C., or 160° C. to 190° C.). In addition to having similar isocyanate functional group blocking properties as strong inorganic acids, the sulfonic acid compound used as Component (ii) is also non-corrosive to steel and will, therefore, not corrode steel processing equipment typically used in the manufacture of lignocellulosic composite articles.

Suitable sulfonic acids that may be used as Component (ii) include dodecylbenzene sulfonic acid, benzene sulfonic acid, dinoylnapthalenedic sulfonic acid, p-tolune sulfonic acid, p-tolune sulphonyl chloride, tosyl chloride, or combinations thereof.

Component (ii) can comprise 0.05% to 6% (e.g., 0.25% to 4% or 0.5% to 3%) by weight of the binder composition based on the total weight of the composition.

Component (iii): Catalyst Compounds

The binder composition disclosed herein can comprise a metallic catalyst compound. Suitable metallic catalysts that can used in the present disclosure as component (ii) include, without limitation, organometallic compounds, such as those that comprise at least one transition metal. The transition metal can be selected from Groups IVB, VB, VIIB, and VIIIB of the Periodic Table of the Elements. In some embodiments, the metallic catalyst comprises an organometallic compound comprising one or more metals selected from the group consisting of the metals of Group VIIIB, such as iron, of the Periodic Table. In certain embodiments, the organometallic compound comprises one or more chelating ligands. Non limiting examples of such chelating ligands include, without limitation, acetylacetone, alkyl or aryl acetoacetate esters, gluconate, cyclopentadienyl, or combinations thereof. In some embodiments, the metallic catalyst that can be used as component (ii) can be any of those that are described in the following U.S. patents, which are fully incorporated herein by reference: U.S. Pat. Nos. 5,587,414, 6,288,200, 6,908,875, 6,750,310, 6,288,255, and 6,762,314.

Other suitable catalysts that can be used as component (ii) include, without limitation, organotin compounds, such as dialkyltindicarboxylates (e.g., dimethyltin dilaurate, bibutyltin dilaurate, dibutyltin di-2-ethyl hexoate, dibutyltin diacetate, dioctyltin dilaurate, dibutyltin maleate, dibutyltin diisoctylmaleate); stannous salts of carboxylic acids (e.g., stannous octoate, stannous diacetate, stannous dioleate); mono- and diorganotin mercaptides (e.g., dibutyltin dimercaptide, dioctyltin dimercaptide, dibutyltin diisooctylmercaptoacetate); diorganotin derivates of beta-diletones (e.g., dibutyltin bis-acetylacetonate); diorganotin oxides (e.g., dibutyltin oxide); and mono- or diorganotin halides (e.g., dimethyltin dichloride and dibutyltin dichloride). Other suitable catalysts that can be used as component (ii) also include, without limitation, organobismuth compounds, such as bismuth carboxylates (e.g., bismuth tris(2-ethlhexoate), bismuth neodecanoate, and bismuth naphtenate).

Accordingly, in certain embodiments, the metallic catalyst can include, without limitation, organometallic compounds that are derived from iron (e.g., ferric acetylacetonate), cobalt acetylacetonate, nickel acetylacetonate, dibutyl tin dilaurate, dibutyltin mercaptide, bismuth tris(2-ethylhexoate) or combinations thereof. In certain embodiments, the metallic catalyst is an organometallic compound that is a derivative of iron. One skilled in the art would recognize that, in certain embodiments, ferric acetylacetonate, cobalt acetylacetonate, nickel acetylacetonate can be described as comprising a chelating ligand and a transition metal.

In certain embodiments, the binder composition disclosed herein does not contain Component (iii).

Component (iii) can comprise 0.0125% to 0.125% (e.g., 0.05% to 0.10%) by weight of the binder composition based on the total weight of the composition.

Component (iv): Other Acidifying Compounds

The binder composition disclosed herein can also comprise other acidifying compounds that are different from Component (ii). Suitable acid compounds that may be used as component (iii) include inorganic and organic acids. Suitable inorganic acids include, without limitation, anhydrous mineral acids (e.g., hydrogen chloride, hydrogen bromide, hydrogen fluoride, sulfuric acid, nitric acid, phosphoric acid); anhydrous Lewis acids (e.g., titanium tetrachloride, zirconium tetrachloride, aluminum trichloride, boron trifluoride); anhydrous chlorides (e.g., thionyl chloride). Suitable organic acids include, without limitation, aromatic carboxylic acid halides (e.g., benzoyl chloride, isophthaloyl dichloride, terephthaloyl dichloride, orthophthaloyldichloride, 4-nitrobenzoyl chloride); aliphatic or cycloaliphatic carboxylic acid halides (e.g., acetyl chloride, b-butyryl chloride, stearoyl chloride); aromatic, aliphatic or cycloaliphatic carbamyl chlorides (e.g., n-benzyl-n-phenylcarbamoyl chloride, n-methyl-n-phenylcarbamoyl chloride, butylcarbamyl chloride); aromatic chlorides (e.g., diphenylchloromethane); or combinations thereof. Other acid compounds that may be used as component (iii) include, without limitation, those that are readily soluble in pMDI and which have low vapor pressure once in a binder. Examples of such acid compounds include, without limitation, gaseous hydrochloric acid, isophthaloyl dichloride, terephthaloyl dichloride, benzoyl chloride, thionyl chloride, or combinations thereof.

Component (iv) can be present in the binder composition at an amount ranging from 0.01% to 5% (e.g., 0.25% to 3% or 0.75% to 2%) by weight based on the total weight of the binder composition.

Component (v): Other Additive Compounds

The binder composition disclosed herein can also comprise other additive compounds or materials that are different from Components (i)-(iv). These additives can include, without limitation, fire retardants, such as tris-(chloropropyl)phosphate (TCPP), triethyl phosphate (TEP), triaryl phosphates such as triphenyl phosphate, melamine, melamine resins, and graphite; pigments; dyes; antioxidants such as triaryl phosphites (e.g., triphenyl phosphite), and hindered phenols (e.g., butylated hydroxyl tolune (BHT), octadecyl-3-(3,5-di-tert-butyl-4-hydroxylphenol)propionate); light stabilizers; expanding agents; inorganic fillers; organic fillers (distinct from the lignocellulosic material described herein); smoke suppressants; slack waxes (liquid or low melting hydrocarbon waxes); antistatic agents; internal mold release agents, such as soaps, dispersed solid waxes, silicones, and fatty acids; inert liquid diluents, especially non-volatile diluents such as triglyceride oils (e.g., soy oil, linseed oil, and the like); solvents, such as the relatively non-volatile solvents such as propylene carbonate; biocides such as boric acid; or combinations of any of the forgoing. The methods for using these and other known optional additives and the specific instances and appropriate amounts will be well understood by those skilled in the art and a detailed discussion of such is not necessary.

Processing

The binder composition of the present disclosure is made using processes and equipment that are well known in the art. Accordingly, a detailed discussion of the process will not be necessary. However, in general, the process involves mixing Components (i), (ii), and, optionally, any additional compounds or materials (e.g., Components (iii), (iv), and/or (v)) together to form the binder composition.

Blended Mixture and Composite

As stated above, the present disclosure is also directed to a blended mixture or mass as well as a lignocellulosic composite article. In certain embodiments, the blended mixture and/or lignocellulosic composite article comprises the binder composition described above and a lignocellulosic material which is described in greater detail below wherein both of these components have been combined and formed into the desired composite by using various methods known in the art.

The lignocellulosic materials that are used as component (b) of the blended mixture or the lignocellulosic composite can be selected from a wide variety of materials. For example, the lignocellulosic material can be a mass of lignocellulosic particle materials. These particles can include, without limitation, wood chips or wood fibers or wood particles such as those used in the manufacture of orientated strand board (OSB), fiberboard, particleboard, carpet scrap, shredded non-metallic automotive wastes such as foam scrap and fabric scrap (sometimes referred to collectively as "light fluff"), particulate plastics wastes, rubber crumb, inorganic or organic fibrous matter, agricultural by-products such as straw, baggasse, hemp, jute, waste paper products and paper pulp or combinations thereof.

As will be described in greater detail below, the lignocellulosic composite can be formed by applying the aforementioned binder composition onto at least one of a lignocellulosic material. These materials are thoroughly mixed to form a blended mixture prior to the mixture being subjected to heat, pressure, or a combination thereof thereby forming a lignocellulosic composite.

In certain embodiments, the aforementioned binder composition is applied onto at least a portion of the lignocellulosic materials, which is typically in the form of small chips, fibers, particles, or mixtures thereof, in a rotary blender or tumbler via one or more devices, such as spray nozzles or spinning disks, located in the blender. The lignocellulosic material is tumbled for an amount of time and sufficient to insure adequate distribution of the binder composition over at least a portion of the lignocellulosic materials thereby forming a blended mixture. Afterwards, the mixture is poured onto a screen or similar apparatus that approximates the shape of the final lignocellulosic composite. This stage of the process is called forming. During the forming stage the lignocellulosic materials are loosely packed and made ready for pressing. A constraining device, such as a forming box, is typically used in order to prevent the loose furnish from spilling out of the sides of the box. After the forming stage, the lignocellulosic materials are subjected to a pressing stage or pressing process where the lignocellulosic materials (including the binder composition) are subjected to elevated temperatures and pressure for a time period that is sufficient to cure the binder composition and form the desired lignocellulosic product. In certain embodiments, the pressing stage can be in the form of continuous or discontinuous presses. In some embodiments, the lignocellulosic materials are pressed at a temperature ranging from 148.0° C. to 232.2° C. for a pressing time cycle ranging from 1.5 minutes to 10 minutes. After the pressing stage, the lignocellulosic product that is typically formed can have a thickness ranging from 0.25 cm to 7.62 cm.

During the production of compression molded (pressed) boards, such as OSB, the forming operation typically takes place immediately after application of the binder composition to the lignocellulosic material. In some embodiments, the final hot pressing of the formed substrate takes place typically within an hour of the forming operation. In certain embodiments, the hot pressing stage takes place as soon as possible after the binder composition is applied to the lignocellulosic material, although delays typically occur during industrial practice. In some embodiments, the hot pressing stage take place within 2 hours, such as within 1 hour or within 30 minutes or within 20 minutes, of the binder composition being applied onto the lignocellulosic material.

In other embodiments, a lignocellulosic composite, such as oriented strand board, comprising separate surface and core layers may be formed using the binder composition and lignocellulosic materials described herein. OSB, for example, is typically constructed using two surface layers and one core layer wherein the orientation of the surface and core flake length is alternated by 90 degrees. This imparts certain mechanical properties and dimensional stability to the final lignocellulosic composite. One or more of the surface and core layers (hereinafter, "substrates") may be treated solely with the binder composition of the present disclosure or it can be treated with a combination of the binder composition and another adhesive that can be either an isocyanate-based adhesive (different from the binder composition of the present disclosure) or a PF (phenol formaldehyde resin) type adhesive.

Once the binder or adhesive is applied onto the substrates, the substrates are moved into a press and compression molded at a press temperature and for a period of time (press residence time) sufficient to cure the binder composition and, optional, adhesive. The amount of pressure applied in the press is sufficient to achieve the desired thickness and shape of the final composite. Pressing may optionally be conducted at a series of different pressures (stages). The maximum pressure is typically between 200 psi and 800 psi, but is more preferably from 300 psi and 700 psi. The total residence time in the press, for a typical OSB manufacturing process, is desirably between 6 seconds per millimeter panel thickness and 18 seconds per millimeter panel thickness, but more preferably between 8 seconds per millimeter panel thickness and 12 seconds per millimeter panel thickness. Pressing is typically accomplished with metal platens which apply pressure behind metal surface plates referred to as caul plates. The caul plates are the surfaces which come into direct contact with the adhesive treated furnish (board pre-forms) during pressing. The caul plates are typically carbon steel plates, but stainless steel plates are sometimes used. The metal surfaces of the caul plates which come into contact with the adhesive-treated lignocellulosic substrate are desirably coated with at least one external mold release agent in order to provide for recovery of the product without damage. External mold release treatments, suitable for press surfaces used in the production of compression molded lignocellulosic articles made from particulate substrates and isocyanate-based adhesives, are well known and their use will be appreciated by those skilled in the art. The use of external mold release is less important when the three layer approach (e.g., phenol formaldehyde resin used on the two outer layers with an isocyanate-based adhesive used in the core layer) is used, but is still desirable. Non-limiting examples of suitable external mold release agents include fatty acid salts such as potassium oletate soaps, or other low surface energy coatings, sprays, or layers.

After the pressing stage, the cured compression molded lignocellulosic article/composite is removed from the press and any remaining apparatus, such as forming screens and caul plates, is separated. Rough edges are typically trimmed from the lignocellulosic composite. The freshly pressed articles can then be subjected to conditioning for a specified time at a specified ambient temperature and relative humidity, in order to adjust the moisture content of the wood to a desired level. This conditioning step is optional however. While OSB is typically a flat board, the production of compression molded lignocellulosic articles with more complex three dimensional shapes is also possible.

Though specific embodiments of the present disclosure has been described in detail for the OSB production, one skilled in the art could apply it to production of other types of compression molded lignocellulosic products such as fiberboard, medium density fiberboard (MDF), particle board, straw board, rice hull board, laminated veneer lumber (LVL) and the like.

Modifications

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosure which is to be given the full breadth of the claims appended and any and all equivalents thereof. Therefore, any of the features and/or elements which are listed above may be combined with one another in any combination and still be within the breadth of this disclosure.

EXAMPLES

Binder Composition Components:

The following compounds are referred to in the examples:

RUBINATE M: Polymeric MDI having an NCO value of 30.5% available from Huntsman International LLC.

HCl: Hydrochloric acid available from Sigma-Aldrich.

DBSA: Dodecylbenzene sulfonic acid available from Sigma-Aldrich.

Description of the Adhesion Test:

A composition's (e.g., the binder compositions described in Table 1) ADHESIVE MEMORY LOSS was calculated through the use various data points gathered via the ADHESION TEST. The ADHESION TEST consists of the following steps: (i) 60 mg of a binder composition was applied to the tip of a yellow poplar (i.e., *Liriodendron tulipifera*) wood veneer sample (e.g., available from Certainly Wood, East Aurora, New York, U.S.A.) having a dimension of 115 mm (L)×20 mm (W)×1 mm (H) that was pre-conditioned to 12 percent moisture content with a small paint brush ("Pre-Loaded Sample"); (ii) the Pre-Loaded Sample and another wood veneer sample (collectively, "Wood Samples") having the same dimensions were placed into an incubator (e.g., Model 3911 available from Thermo Scientific Marietta, Ohio, U.S.A) and pre-cured at 60° C. and 90% relative humidity for a specified amount of time (e.g., 0, 2, 2.5, and 3 hour intervals); (iii) the Wood Samples were removed from the incubator and placed into a hot press/shear testing device (e.g., Model 311c available from Adhesive Evaluation Systems, Inc.) and pressed for 150 seconds at 116° C.

and at 130 psi to bond the Wood Samples to form a composite; and (iv) the bond strength of the composite was measured immediately after Step (iii) using the hot press/shear testing device.

Calculation of Adhesive Memory Loss:

A composition's ADHESIVE MEMORY LOSS was calculated using Formula X:

$$\text{ADHESIVE MEMORY LOSS} = 100 * [(BndS_3 - BndS_0)/BndS_0] \quad \text{Formula X:}$$

wherein
- $BndS_3$ means a composition's bond strength as determined using the ADHESION TEST after the wood veneer sample has been pre-cured for 3 hours at 60° C. and 90% relative humidity using an incubator (e.g., Model 3911 available from Thermo Scientific Marietta, Ohio, U.S.A).
- $BndS_0$ means a composition's bond strength as determined using the ADHESION TEST after the wood veneer sample has been pre-cured for 0 hours at 60° C. and 90% relative humidity using an incubator (e.g., Model 3911 available from Thermo Scientific Marietta, Ohio, U.S.A).

Description of Metal Loss Test:

The METAL LOSS TEST was used to simulate the corrosive effects of a binder composition (e.g., the binder compositions described in Table 1) on a steel mold that is typically used in the manufacture of a lignocellulosic composite article. The METAL LOSS TEST consists of the following steps: (i) steel shim stock samples having a dimension of 120 mm (L)×20 mm (W)×2 mm (H) (available from McMaster-Carr) and having a corrosion surface of about 600 mm² wherein each corrosion surface (i.e., the surfaces located on opposing sides of the steel shim) was coated with the binder compositions shown in Table 1 using a ½ inch paint brush; (ii) the steel shim stock samples were then sandwiched between two wood veneer samples (available from Certainly Wood, East Aurora, New York, U.S.A.) having the same dimensions as the steel shim stock sample; (iii) the sandwich assembly was placed in a hot press/shear testing device (e.g., Model 311c available from Adhesive Evaluation Systems, Inc.) and pressed for 2 minutes at 177° C.; (iv) after each press, the wood veneer samples were removed from the steel shim stock sample and each steel shim was weighed using an analytical scale (e.g., AE 200 available from Mettler) to determine the weight of the steel shim sample; and (v) repeating Steps (iv)-(v) for a specified amount of cycles (e.g., 50 cycles).

Calculation of Metal Loss:

A steel shim's METAL LOSS was calculated using Formula Y:

$$\text{METAL LOSS} = (\text{SLOPE } S1 + \text{SLOPE } S2 + \text{SLOPE } S3 + \text{SLOPE } S4 + \text{SLOPE } S5)/5 \quad \text{Formula Y:}$$

wherein $$\text{SLOPE } S1 = (W_{10} - W_0)/10 \quad \text{Formula S1:}$$

wherein
- $W_{10}$ means a steel shim's weight as measured using the METAL LOSS TEST after the steel shim has undergone 10 pressing cycles.
- $W_0$ means a steel shim's weight as measured using the METAL LOSS TEST after the steel shim has undergone 0 pressing cycles.

$$\text{SLOPE } S2 = (W_{20} - W_{10})/10 \quad \text{Formula S2:}$$

wherein
- $W_{20}$ means a steel shim's weight as measured using the METAL LOSS TEST after the steel shim has undergone 20 pressing cycles.
- $W_{10}$ means a steel shim's weight as measured using the METAL LOSS TEST after the steel shim has undergone 10 pressing cycles.

$$\text{SLOPE } S3 = (W_{30} - W_{20})/10 \quad \text{Formula S3:}$$

wherein
- $W_{30}$ means a steel shim's weight as measured using the METAL LOSS TEST after the steel shim has undergone 30 pressing cycles.
- $W_{20}$ means a steel shim's weight as measured using the METAL LOSS TEST after the steel shim has undergone 20 pressing cycles.

$$\text{SLOPE } S4 = (W_{40} - W_{30})/10 \quad \text{Formula S4:}$$

wherein
- $W_{40}$ means a steel shim's weight as measured using the METAL LOSS TEST after the steel shim has undergone 40 pressing cycles.
- $W_{30}$ means a steel shim's weight as measured using the METAL LOSS TEST after the steel shim has undergone 30 pressing cycles.

$$\text{SLOPE } S5 = (W_{50} - W_{40})/10 \quad \text{Formula S5:}$$

wherein
- $W_{50}$ means a steel shim's weight as measured using the METAL LOSS TEST after the steel shim has undergone 50 pressing cycles.
- $W_{40}$ means a steel shim's weight as measured using the METAL LOSS TEST after the steel shim has undergone 40 pressing cycles.

Overview of Table 1:

Table 1 shows the formulations of the 3 binder compositions used to obtain the various data points shown in Tables 2 and 3.

TABLE 1

| Components* | Composition 1 | Composition 2 | Composition 3 |
|---|---|---|---|
| pMDI | 100 | 99.86 | 99 |
| HCl | 0 | 0.14 | 0 |
| Dodecylbenzene sulfonic acid | 0 | 0 | 1 |

*Components are in weight percent based on the total weight of the composition

Overview of Table 2:

Table 2 shows the measured bond strength of each composition after the composition was applied onto a wood veneer sample and pre-cured for the designated time intervals (i.e., 0 hours, 2 hours, 2.5 hours, and 3 hours) pursuant to the ADHESION TEST. The ADHESIVE MEMORY LOSS for Compositions 1, 2, and 3 was determined using the ADHESION TEST and Formula X.

TABLE 2

| Time Interval | Composition 1 (Bond Strength) | Composition 2 (Bond Strength) | Composition 3 (Bond Strength) |
|---|---|---|---|
| 0 Hours | 206 | 170 | 179 |
| 2 Hours | 420 | 312 | 469 |
| 2.5 Hours | 145 | 91 | 226 |
| 3 Hours | 63 | 37 | 114 |

TABLE 2-continued

| Time Interval | Composition 1 (Bond Strength) | Composition 2 (Bond Strength) | Composition 3 (Bond Strength) |
|---|---|---|---|
| ADHESIVE MEMORY LOSS* | 69 | 78 | 36 |

*Calculated pursuant to Formula X and a lower number means better performance

Composition 3 represents one embodiment of a binder composition of the present disclosure. As can be seen from Table 2, the ADHESIVE MEMORY LOSS of Composition 3 when compared to Compositions 1 and 2 is unexpectedly better. For example, Compositions 3's ADHESIVE MEMORY LOSS is 36 as compared to Compositions 1 and 2 which had an ADHESIVE MEMORY LOSS of 69 and 78, respectively.

Overview of Table 3:

Table 3 shows the weight of steel shim stock samples coated with Compositions 1, 2, and 3 (Panels 1, 2, and 3, respectively). The METAL LOSS TEST described above was the process used to coat each panel with the compositions shown in Table 1 and the process used to weigh each panel after a designated pressing cycle (e.g., Cycle 10, 20, 30).

TABLE 3

| Pressing Cycle | Weight of Panel 1 coated with Composition 1 (in g/m²) | Weight of Panel 2 coated with Composition 2 (in g/m²) | Weight of Panel 3 coated with Composition 3 (in g/m²) |
|---|---|---|---|
| 0 | 2.8988 | 2.781 | 2.7278 |
| 10 | 2.8978 | 2.7793 | 2.7287 |
| 20 | 2.8972 | 2.7783 | 2.7285 |
| 30 | 2.8959 | 2.7771 | 2.728 |
| 40 | 2.8961 | 2.7755 | 2.728 |
| 50 | 2.896 | 2.7743 | 2.7276 |

Overview of Table 4:

The slope of each Panel's weight through Cycles 0 to 50 are shown in Table 4:

TABLE 4

| Slope* | Panel 1 | Panel 2 | Panel 3 |
|---|---|---|---|
| SLOPE S1 | −0.001 | −0.0017 | 0.0009 |
| SLOPE S2 | −0.0006 | −0.001 | −0.0002 |
| SLOPE S3 | −0.0013 | −0.0012 | −0.0005 |
| SLOPE S4 | 0.0002 | −0.0016 | 0 |
| SLOPE S5 | −0.0001 | −0.0012 | −0.0004 |

*Calculated pursuant to Formulas S1 through S5

Overview of Table 5:

The METAL LOSS for Panels 1 through 3 was determined using Formula Y.

| | Panel 1 | Panel 2 | Panel 3 |
|---|---|---|---|
| METAL LOSS* | −0.000056 | −0.000134 | −0.000004 |

*Calculated pursuant to Formula Y

As can be seen in Table 3, Composition 3 had a METAL LOSS that is orders of magnitude less than either Composition 1 and/or Composition 2. In other words, little to no corrosion was occurring on the steel shim sample that was coated with Composition 3.

Overview of Tables 1 Through 5

Tables 1 and 5 show the Composition 3 (which is an embodiment of the binder composition disclosed herein) not only provides an ADHESIVE MEMORY LOSS that exceeds Compositions 1 and 2, but it also does not degrade a steel substrate as shown by the calculated METAL LOSS.

What is claimed is:

1. A lignocellulosic mixture comprising:
   (a) a binder composition comprising:
      (i) an isocyanate compound;
      (ii) a sulfonic acid compound;
      (iii) an acidifying compound different from component (ii) selected from an anhydrous mineral acid, an anhydrous Lewis acid, an anhydrous chloride and an organic acid; and optionally
      one or more of (iv) a catalyst compound, and (v) an additive compound;
   wherein the binder composition contains greater than or equal to 90 wt. % of Component (i) and 0.05 wt. % to 6 wt. % of Component (ii) based on the total weight of the binder composition and Components (iii), (iv) and (v) comprise the remainder of the binder composition and
   wherein an ADHESIVE MEMORY LOSS of the binder composition is less than or equal to 50 and a METAL LOSS on a surface of a metallic article that comes into contact with the binder composition is greater than or equal to −0.00009; and wherein ADHESIVE MEMORY LOSS is calculated using Formula X and wherein METAL LOSS is calculated using Formula Y:

$$\text{ADHESIVE MEMORY LOSS} = 100*[(BndS_3 - BndS_0)/BndS_0] \quad \text{Formula X:}$$

wherein $BndS_3$ means a composition's bond strength as determined using the ADHESION TEST after a wood veneer sample has been pre-cured for 3 hours at 60° C. and 90%;

$BndS_0$ means a composition's bond strength as determined using the ADHESION TEST after the wood veneer sample has been pre-cured for 0 hours at 60° C. and 90%; and $$\text{METAL LOSS} = (\text{SLOPE } S1 + \text{SLOPE } S2 + \text{SLOPE } S3 + \text{SLOPE } S4 + \text{SLOPE } S5)/5 \quad \text{Formula Y:}$$

wherein $$\text{SLOPE } S1 = (W_{10} - W_0)/10$$

wherein $W_{10}$ means a steel shim's weight as measured using the METAL LOSS TEST after the steel shim has undergone 10 pressing cycles;

$W_0$ means a steel shim's weight as measured using the METAL LOSS TEST after the steel shim has undergone 0 pressing cycles;

$$\text{SLOPE } S2 = (W_{20} - W_{10})/10$$

wherein $W_{20}$ means a steel shim's weight as measured using the METAL LOSS TEST after the steel shim has undergone 20 pressing cycles;

$W_{10}$ means a steel shim's weight as measured using the METAL LOSS TEST after the steel shim has undergone 10 pressing cycles;

$$\text{SLOPE } S3 = (W_{30} - W_{20})/10$$

wherein
W$_{30}$ means a steel shim's weight as measured using the METAL LOSS TEST after the steel shim has undergone 30 pressing cycles;
W$_{20}$ means a steel shim's weight as measured using the METAL LOSS TEST after the steel shim has undergone 20 pressing cycles;

SLOPE $S4=(W_{40}-W_{30})/10$ wherein
W$_{40}$ means a steel shim's weight as measured using the METAL LOSS TEST after the steel shim has undergone 40 pressing cycles;
W$_{30}$ means a steel shim's weight as measured using the METAL LOSS TEST after the steel shim has undergone 30 pressing cycles;

SLOPE $S5=(W_{50}-W_{40})/10$ wherein
W$_{50}$ means a steel shim's weight as measured using the METAL LOSS TEST after the steel shim has undergone 50 pressing cycles;
W$_{40}$ means a steel shim's weight as measured using the METAL LOSS TEST after the steel shim has undergone 40 pressing cycles; and
(b) one or more lignocellulosic particles wherein at least a portion of the lignocellulosic particles is partially coated with the binder composition.

2. The lignocellulosic mixture according to claim 1, wherein Component (ii) comprises dodecylbenzene sulfonic acid, benzene sulfonic acid, dinoylnapthalenedic sulfonic acid, p-tolune sulfonic acid, p-tolune sulphonyl chloride, tosyl chloride, or combinations thereof.

3. The lignocellulosic mixture according to claim 1, wherein the metallic article comprises steel.

4. The lignocellulosic mixture according to claim 1, wherein the mixture does not contain Component (iv).

5. A method of making a lignocellulosic mixture comprising:
(a) providing a binder composition comprising:
 (i) an isocyanate compound;
 (ii) a sulfonic acid compound;
 (iii) an acidifying compound different from component (ii) selected from an anhydrous mineral acid, an anhydrous Lewis acid, an anhydrous chloride and an organic acid; and optionally
 one or more of (iv) a catalyst compound, and (v) an additive compound;
wherein the binder composition contains greater than or equal to 90 wt. % of Component (i) and 0.05 wt. % to 6 wt. % of Component (ii) based on the total weight of the binder composition and Components (iii), (iv) and (v) comprise the remainder of the binder composition and
wherein an ADHESIVE MEMORY LOSS of the binder composition is less than or equal to 50 and a METAL LOSS on a surface of a metallic article that comes into contact with the binder composition is greater than or equal to −0.00009; and wherein ADHESIVE MEMORY LOSS is calculated using Formula X and wherein METAL LOSS is calculated using Formula Y:

ADHESIVE MEMORY LOSS=100*[(BndS$_3$−BndS$_0$)/BndS$_0$]  Formula X:

wherein
BndS$_3$ means a composition's bond strength as determined using the ADHESION TEST after a wood veneer sample has been pre-cured for 3 hours at 60° C. and 90% relative humidity;
BndS$_0$ means a composition's bond strength as determined using the ADHESION TEST after the wood veneer sample has been pre-cured for 0 hours at 60° C. and 90% relative humidity;
and METAL LOSS=(SLOPE $S1$+SLOPE $S2$+SLOPE $S3$+SLOPE $S4$+SLOPE $S5$)/5  Formula Y:

wherein

SLOPE $S1=(W_{10}-W_0)/10$ wherein
W$_{10}$ means a steel shim's weight as measured using the METAL LOSS TEST after the steel shim has undergone 10 pressing cycles;
W$_0$ means a steel shim's weight as measured using the METAL LOSS TEST after the steel shim has undergone 0 pressing cycles;

SLOPE $S2=(W_{20}-W_{10})/10$ wherein W$_{20}$ means a steel shim's weight as measured using the METAL LOSS TEST after the steel shim has undergone 20 pressing cycles;
W$_{10}$ means a steel shim's weight as measured using the METAL LOSS TEST after the steel shim has undergone 10 pressing cycles;

SLOPE $S3=(W_{30}-W_{20})/10$ wherein
W$_{30}$ means a steel shim's weight as measured using the METAL LOSS TEST after the steel shim has undergone 30 pressing cycles;
W$_{20}$ means a steel shim's weight as measured using the METAL LOSS TEST after the steel shim has undergone 20 pressing cycles;

SLOPE $S4=(W_{40}-W_{30})/10$ wherein
W$_{40}$ means a steel shim's weight as measured using the METAL LOSS TEST after the steel shim has undergone 40 pressing cycles;
W$_{30}$ means a steel shim's weight as measured using the METAL LOSS TEST after the steel shim has undergone 30 pressing cycles;

SLOPE $S5=(W_{50}-W_{40})/10$ wherein
W$_{50}$ means a steel shim's weight as measured using the METAL LOSS TEST after the steel shim has undergone 50 pressing cycles;
W$_{40}$ means a steel shim's weight as measured using the METAL LOSS TEST after the steel shim has undergone 40 pressing cycles;
(b) providing one or more lignocellulosic particles; and
(c) blending the binder composition and at least a portion of the one or more lignocellulosic particles to form the lignocellulosic mixture.

6. The method according to claim 5, wherein the metallic article is a metallic mold comprising an internal cavity, and wherein the method further comprises placing the lignocellulosic mixture into the internal cavity and pressing the lignocellulosic mixture with said metallic mold to form a lignocellulosic article.

7. A lignocellulosic mixture comprising:
(a) a binder composition comprising:
   (i) an isocyanate compound;
   (ii) a sulfonic acid compound;
   (iii) an acidifying compound different from component (ii) selected from an anhydrous mineral acid, an anhydrous Lewis acid, an anhydrous chloride and an organic acid; and
   one or more of (iv) a catalyst compound, and (v) an additive compound wherein the binder composition contains greater than or equal to 90 wt. % of Component (i) and 0.05 wt. % to 6 wt. % of Component (ii) based on the total weight of the binder composition and Components (iii), (iv) and (v) comprise the remainder of the binder composition; and
(b) one or more lignocellulosic particles wherein at least a portion of the lignocellulosic particles is partially coated with the binder composition.

8. The lignocellulosic mixture according to claim 7, wherein Component (ii) comprises dodecylbenzene sulfonic acid, benzene sulfonic acid, dinoylnapthalenedic sulfonic acid, p-tolune sulfonic acid, p-tolune sulphonyl chloride, tosyl chloride, or combinations thereof.

9. The lignocellulosic mixture according to claim 7, wherein the mixture does not contain Component (iv).

* * * * *